United States Patent [19]

Mouriér

[11] 4,167,668
[45] Sep. 11, 1979

[54] PROCESS AND APPARATUS FOR SEPARATING ISOTOPES

[75] Inventor: Georges Mouriér, Paris, France

[73] Assignee: Thomson-CSF, Paris, France

[21] Appl. No.: 830,657

[22] Filed: Sep. 6, 1977

[30] Foreign Application Priority Data

Sep. 7, 1976 [FR] France .................. 76 26872

[51] Int. Cl.$^2$ ............................................. B01D 59/44
[52] U.S. Cl. .................................. 250/291; 250/281
[58] Field of Search ............. 250/281, 290, 293, 423 P

[56] References Cited

U.S. PATENT DOCUMENTS

| B 455,520 | 1/1975 | Beauchamp | 250/290 |
|---|---|---|---|
| 2,868,986 | 1/1959 | Lanneau et al. | 250/291 |

Primary Examiner—Harold A. Dixon
Attorney, Agent, or Firm—Roland Plottel

[57] ABSTRACT

This invention deals with a process of separating isotopes. Isotopes of atomic mass $m_1$ and $m_2$ are in a plasma. Isotope $m_1$ is of low concentration and isotope $m_2$ is dominant. The plasma is submitted to a time constant uniform magnetic field and to an orthogonal high frequency electric field. To facilitate the separation a third isotope of atomic mass $m_3$ is included in the plasma. The atomic mass $m_3$ of the third isotope is such that $m_3 = 2m_1 - m_2$ and its concentration is (for all practical purposes) equal to that of the dominant isotope. The frequency of the electric field is adjusted to the value of the cyclotron frequency of the isotope of mass $m_1$ in the plasma. One thus compensates the polarization of the plasma due to the dominant isotope and increases the tolerance of the process to the natural fluctuations of the plasma. The ions of the isotope 1 are collected at the extremity of the plates (12) and (14), while those of the isotopes 2 and 3 are collected on (16).

The invention will find application in the separation of the two isotopes $U_{235}$ and $U_{238}$.

4 Claims, 2 Drawing Figures

PROCESS AND APPARATUS FOR SEPARATING ISOTOPES

The invention deals with a process and apparatus to separate isotopes.

In accordance with a well known property, the invention makes use of the combined action—upon a plasma containing the isoptopes to be separated—of a sinusoidal high frequency electric field perpendicular to a time constant uniform magnetic field; see for example *Electromagnetic Separation of Isotopes in Commercial Quantities*, ed. Wakerling & Guthrie, Chapter 12: "The Resonance Method" by J. R. Richardson.

Under the influence of these fields, the ionized atoms of the isotopes move in the plasma following trajectories which depend largely on their masses. It is thus possible to discriminately capture one of the isotopes on electrodes which intersect certain of these trajectories.

The process set forth in the invention is particularly easy to set up in the case of two isotopes contained in very different proportions in the plasma such as the isotopes $U_{235}$ and $U_{238}$ of uranium. This example is used in the application and is referred to several times but with the understanding that this example is to simplify the explanation and the invention is not limited to that example.

In accordance with the known formulas, the proper frequency of rotation or cyclotron frequency $f_c$, in hertz, of the ions of uranium $U_{235}$, $U_{235}^+$ is approximately $f_c = 6.54\, B$; B standing for the magnetic induction in the plasma measured in gauss; the corresponding radian frequency $\omega_c$ is $\omega_c = 2\pi f_c$. Generally we have $f_c = e/(2\pi n)\, B$, where m stands for the mass of the ion, and e its electric charge.

For a frequency f of the electric field close to the previous resonance frequency $f_c$, the ions of the isotope $U_{235}$ follow spiral-like trajectories whose radius increases constantly with the distance z from the source from where they issued. The structure where this takes place often consists of two electrodes shaped as plane parallel plates between which is applied a sinusoidal potential which gives rise to the electric field directed perpendicularly to these plates, and of a source of ions placed at one of the extremities of the space between the electrodes.

The $U^+_{238}$ ions, i.e., the other isotope in the plasma has a resonance frequency $f_c'$ that is different from the frequency $f_c$ (of the $U^+_{235}$ ions). These ions follow trajectories whose radius varies periodically between two values along the length of the axis of the structure. This radius (given certain operating conditions) is notably smaller than the radius of the trajectory of the $U^+_{235}$ ions at the end of their trip.

Thus it is possible to selectively capture the lighter ions at the end of their trajectory on those electrodes which are not reached by the heavy ions. The heavy ions are collected separately on a collector located at another part of the structure. We thus separate the wanted ions (e.g. $U_{235}^+$) of the less abundant type, that is to say of the type of which we want the enrichment, (herein called type 1), from the ions (e.g., $U_{238}^+$) of the other or unwanted type (herein called type 2).

This method of separation nevertheless encounters an important difficulty. When dense plasmas are used in order to obtain industrial quantities, there appears a shielding effect, i.e., the plasma acts as a good conductor into which the electric field penetrates only poorly. This effect depends on the composition of the plasma, i.e., on the different particles it contains and of their proportions in the plasma and also on the value of the particles' cyclotron frequencies in relation to the frequency of the applied electric field.

To illustrate this consider the polarization vector $$\vec{p} = \sum_k q_k \vec{r}_k$$

where the summation $$\sum_k$$

covers all the ionized particles present in the plasma; $q_k$ designating their individual charge; $\vec{r}_k$ their geometric displacement under the influence of the electric field; and k is the subscript relative to each particle.

The former relation can also be expressed, if there exists populations of identical particles of the same type, as:

$$\vec{P} = \sum_i q_i \vec{r}_i n_i.$$

In this case, i is the subscript relative to the populations of identical ions, $q_i$ designates their charge, and $n_i$ is the number of particles of each type.

This effect is pronounced when the total polarization of the plasma, equal to the sum of the partial polarizations of each of the types of particles which it contains, is high. But, at the same time, for a given particle, the radius of the trajectory only has a regular increase along the length of the axis of propagation if its cyclotron frequency is very close to the frequency of the electric field. Finally, because of the natural instabilities of plasmas (due principally to the most abundant types of isotopes in the plasma) the frequency of the electric fields at the heart of the plasma varies slightly—even for fixed condition of excitation, i.e., for fixed values of the magnetic induction B and of the electric field of frequency $\omega$ which in the present state of plasma techniques we know how to maintain with great precision. These instabilities cause fluctuation with time (t) of the maximal value $E_o$ of the sinusoidal electric field $E_o \sin\omega t$, $E_o$ is thus modulated in time, and $E_o = E_o(t)$. Also variation of the frequency $\omega$ from the desired cyclotron frequency $\omega_{ci}$ (i.e.) the frequency of the particle or ion that is to be separated) reduces the value of the polarization of those ions in the plasma and thus the possibilities and efficacy of their separation. The expression of the polarization is detailed below.

From the equation of the movement of an ionized particle in an elementary sinusodial electric field $$E = E_o \sin\omega t$$

of frequency $\omega$ (oriented along the x axis) perpendicularly to the plates, expression of the total polarization of the medium is:

$$P_x = E \sum_i \frac{n_i q_i^2}{m_i} \cdot \frac{1}{\omega_{ci}^2 - \omega^2} \tag{1}$$

$\omega$ designating the cyclotron frequency of the particle $c_i$ of type i and $q_i$, $m_i$ and $n_i$ respectively its charge, its mass and the number of particles of this type present by unit volume in the plasma.

The use of such an elementary field is justified by the fact that, in a uniform medium and independently of the movement of the particle, it is always possible to decompose the electric field into Fourier integrals.

This expression shows that the total polarization of the plasma called P from here on, varies rapidly with the difference $\omega_{ci}-\omega$ due to the presence of the terms $\omega_{ci}^2-\omega^2$.

It is possible in the case of the two types designated with the subscript 1 and 2, to choose the frequency $\omega$ of the excitating field in such a way as to annul this polarization and to facilitate the penetration of the electric field into the plasma.

To achieve this the following condition must be met:

$$\frac{n_1 q_1^2}{m_1} \cdot \frac{1}{\omega_{c1}^2-\omega^2} + \frac{n_2 q_2^2}{m_2} \cdot \frac{1}{\omega_{c2}^2-\omega^2} = 0 \quad (2)$$

which leads to, with $q_1=q_2$ and taking into account the inverse proportionality of masses m to the frequency $\omega$, the condition $$\omega = \omega_{c1}(1 - \frac{n_1}{n_2} \cdot \frac{\Delta m}{m})$$

$\Delta m$ designating the difference between the masses of the two isotopes; and m designates the average mass of these isotopes. For example, in the case of the uranium considered above, where $m_1$ is 235 the mass of the light isotope, and $m_2$ is 238 the mass of the heavy isotope, and where $n1/n2=1/140$, this condition leads to $\omega=\omega_{c1}(1-0.0001)$ that is to say to an extremely narrow margin of 1/10,000th for the frequency $\omega$.

It is thus possible to separate, according to the known method, two types of isotopes by application of a crossed magnetic and electric field; this separation, however, has been shown to be extremely delicate because of natural variations of polarization and of the electric field.

An object of the process of this invention is to overcome this difficulty. To this end, the invention provides for mixing with the two types to be separated a third type. Both the mass and the concentration of this third type in the plasma are chosen so that the polarization due to this third type is, for all practical purposes, equal to, but of opposite sign to that due to the unwanted type (e.g., in the case of uranium, to the most abundant isotope 238). The addition of this third type reduces the delicate character of the process. In a preferred embodiment, the concentration of this third type in the plasma is equal for all practical purposes to that of the unwanted type. After separation, the added type mat be recovered for instance by chemical means and then used again.

According to the invention there is provided a process for separating two isotopes of a substance in which said isotopes are in very unequal proportions, comprising the steps of forming a plasma which contains the ions of said isotopes; applying a high frequency electric field and a perpendicular constant uniform magnetic field to said plasma, said electric field's frequency being for all practical purposes equal to the cyclotron frequency in the plasma of the ion of the least abundant isotope; including ions of a third type in the plasma, their proportion in the plasma being defined by the formula:

$$\frac{n_3}{n_2} = \frac{m_3}{m_2} \cdot \frac{\omega_{c1}^2-\omega_{c3}^2}{\omega_{c2}^2-\omega_{c1}^2}$$

m, n, and $\omega$ designate respectively the mass, the number per unit of volume or concentration, and the cyclotron frequency of each type of ions in the plasma with the subscript 1 for the least abundant isotope, 2 for the other isotope and 3 for the said third type.

Figure 1:
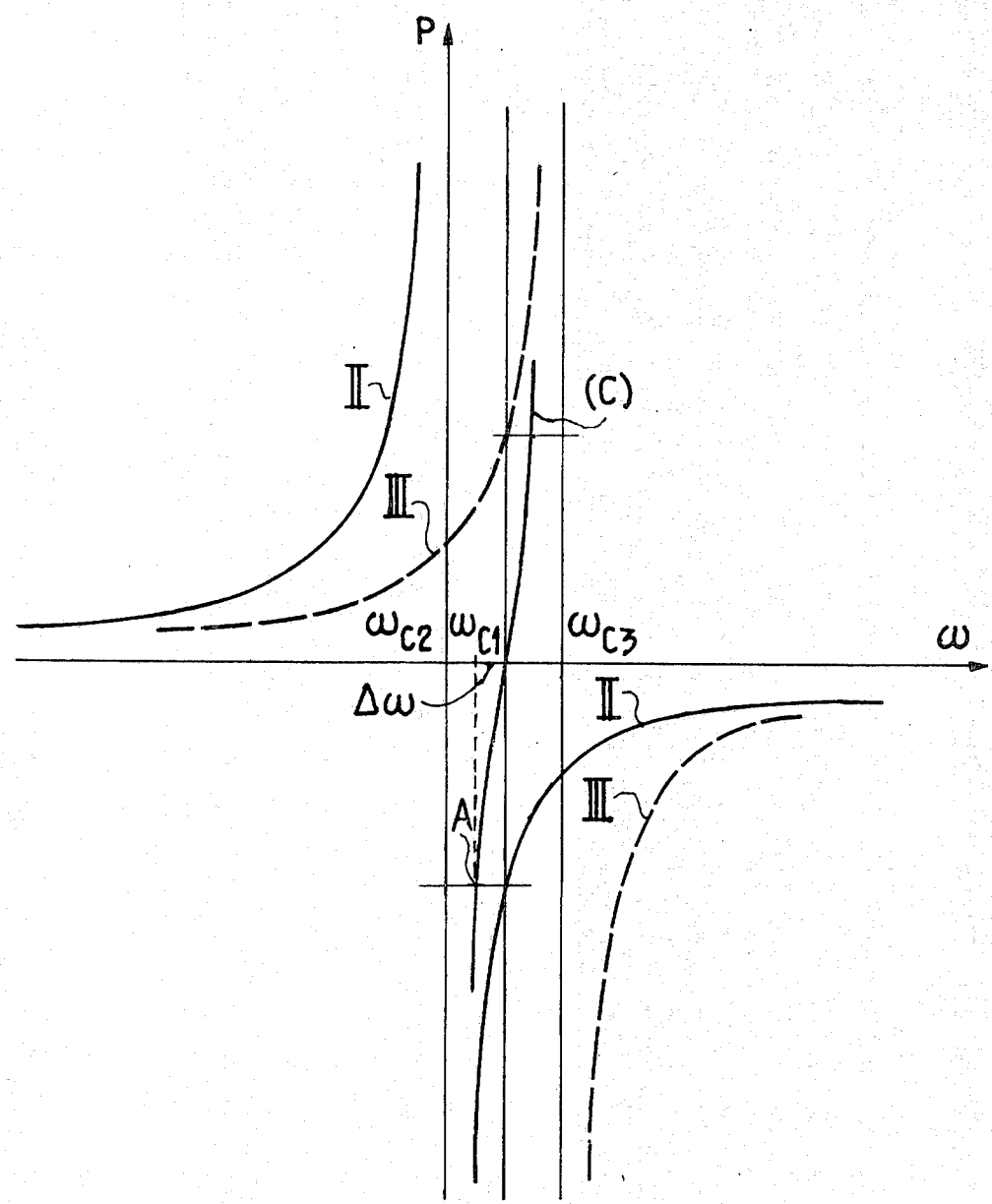
FIG. 1 is a diagram illustrating the improvement of the invention over the known process.

By introducing a third type of particle into a medium or plasma (having two types to be separated⊖one of small concentration, and the other of large concentration and unwanted) there is produced a condition less favorable to variations of the polarization of the medium due to the unwanted types (i.e., to the particles of the unwanted type 2 and those of the added type 3). In effect, the variations due to each of the two abundant particles whose polarizations are of the same order are not independent from each other; there exists a correlation between them and they can compensate each other mutually in certain conditions which will be specified.

The introduction of this third type into the plasma, in accordance with the process of separation as set forth by the invention, under conditions to be specified, has therefore the effect of reducing even further the delicate quality of the separation carried out with the known process discussed above.

The third type in the plasma will, in what follows, be designated by the subscript 3; $n_3$, $m_3$, $q_3$ and $\omega_3$ designate the previously considered quantities that correspond to it (namely, number of particles, mass of the ion, charge and cyclotron frequency of the ion).

The total polarization P, at the heart of the plasma then becomes the sum of the polarizations $P_1$ and $P_2$ due to the two isotopes to be separate (subscripted 1 and 2) and of the polarization $P_3$ due to the added element. We have:

$$P = \left[ \frac{a}{\omega_{c1}^2-\omega^2} + \frac{b}{\omega_{c2}^2-\omega^2} + \frac{c}{\omega_{c3}^2-\omega^2} \right] E \quad (3)$$

where:

$$a = \frac{n_1 q_1^2}{m_1}, b = \frac{n_2 q_2^2}{m_2} \text{ and } c = \frac{n_3 q_3^2}{m_3};$$

We have: $q_1=q_2=q_3$.

According to the invention, b and c are chosen so that the sum of the two last terms $P_2$ and $P_3$ be equal to zero at the cyclotron resonance of the type 1. This brings the following relation:

$$\frac{b}{\omega_{c2}^2-\omega_{c1}^2} + \frac{c}{\omega_{c3}^2-\omega_{c1}^2} = 0 \quad (4)$$

or $$\frac{n_3}{n_2} = \frac{m_3}{m_2} \cdot \frac{\omega_{c1}^2-\omega_{c3}^2}{\omega_{c2}^2-\omega_{c1}^2}.$$

In one embodiment the mass $m_3$ is chosen so that it differs from the mass $m_1$ by an amount equal to, and of opposite sign to, the difference between the mass $m_2$ and the mass $m_1$, i.e., $m_3 = 2m_1 - m_2$.

In these conditions, the mass $m_3$ is close to those of the isotopes; and in the equation (4) the second term is close to 1; the ratio $n_3/n_2$ is therefore also close to 1. The ionic concentration of the type 3 isotope added to the plasma is close to the ionic concentration of the unwanted type 2 isotope. The devices (in which the process as set forth by the invention is carried out) are adjusted so that the conditions of cyclotron resonance of the type 1 isotope are achieved.

In the case of uranium, the value of $m_3$ is 232. For this third type, one will preferably select thorium, whose atomic mass is 232, and an element radioactively stable and relatively abundant. This will produce $Th^+_{232}$ ions in the plasma with a density equal to that of the ions $U^+$.

To generalize, in accordance with a preferred method of separation, one introduces by any of several means, physical or chemical, into a plasma formed of two isotopes of very unequal concentration, the smaller concentration having atomic mass $m'$ and the other isotope by far the more abundant having an atomic mss $m''$, a third type mass isotope having atomic mass $m'''$ such that $m''' = 2m' - m''$ and in a quantity roughly equal to that of the unwanted abundant isotope.

The improvement brought on by the invention is detailed below in the case of uranium and with the aid of the diagram of FIG. 1.

This diagram is a graph showing polarization P, and frequency $\omega$.

The differences $\omega_{c3} - \omega_{c1}$ and $\omega_{c2} - \omega_{c1}$ are for all practical purposes equal in absolute values. polarization Continuous line II represents the curve of polarization $P_2$ due to the type 2 ions of cyclotron frequency $\omega_{c2}$ in a plasma formed of two ions of types 1 and 2. The polarizaton $P_2$ at the cyclotron resonance of the type 1 ion, is shown at the ordinate of point A.

Broken line III represents the curve of the polarization $P_3$ due to the compensating type 3 ion of cyclotron frequency $\omega_{c3}$.

Continuous line (C) is a curve of both of the types 2 and 3 according to the process of the invention.

The polarization due to the two combined unwanted types 2 and 3 is less than when there is a sole unwanted type (prior art processes) over a range of frequency about $\omega_{c1}$; this interval is the one limited to the line passing through the point A and the parallel to the ordinate axis.

It is thus possible (thanks to the introduction of the ions of the third type to the plasma according to the process of the invention) to tolerate not only the variations of the frequency of the electric field which covers this entire interval, but also the fluctuations of the plasma which causes them, without exceeding a polarization of the plasma by the two unwanted types greater than the polarization due to the sole unwanted particle of the prior art processes.

One will note in addition that the polarization $P_1$ due to the light isotope $U_{235}$ will remain superior in absolute value to the sum of the polarization $P_2$ and $P_3$ due to the two other types $U_{238}$ and $Th_{232}$ in an entire interval of frequency which one can calculate with the help of the relation (3). This interval, for the uranium for which $m_1 - m_3 = m_2 - m_1 = 3$, is of 7.6/10,000. But, in the case of a plasma which solely contains the two isotopes of uranium, this interval from the equation (2) was only of 1/10,000. Thus, all other variables remaining unchanged, there is a frequency whose interval is about eight times bigger. The separation thus is less delicate in frequency than it was for the prior art processes. This is an important advantage of the process of the invention.

It is possible, in this process, with all variables held the same, to effect a quicker separation than in the prior art process. There is also a shorter plasma. This is an advantage of the process of the invention correlated to the previous advantage.

Figure 2:
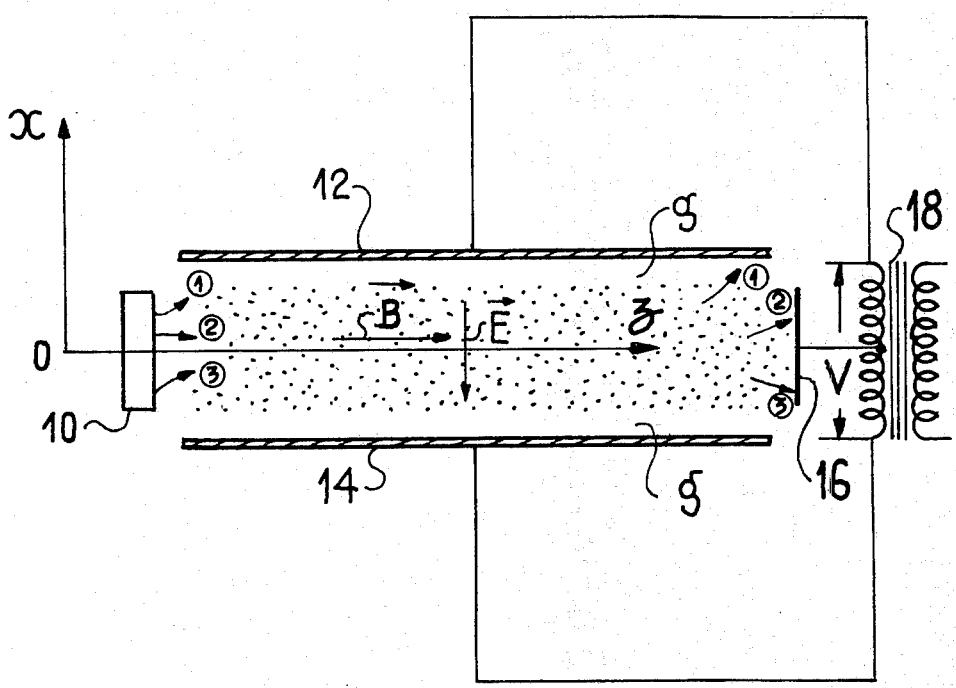
FIG. 2 is a schematic diagram of an apparatus for carrying out the process of the invention.

FIG. 2 is a schematized representation of an apparatus for carrying out the process of the invention.

In FIG. 2 a source of ions 10 produces the ions of the three types: represented by the circled legends ①, ② and ③; these ions are formed into a plasma (by means not shown). Two plane parallel plates, 12 and 14, are connected to a source 18 of a.c. potential V, and establish between them an alternating potential difference V whose frequency $\omega_{c1}$ is equal to the cyclotron frequency of the particles which are to be collected; this potential difference creates an electric field $\vec{E}$, directed along an axis x perpendicularly to the direction of these plates. The plasma is represented by the surface covered with dots and is separated from the plates by the sheath g. The field $\vec{E}$ extends through the plasma. The type 1 ions shown as ① are collected on the plates 12 and 14 at the end opposite to the one closest to the source. An ion collector 16 electrically connected to a center tap (e.g., ground) of the winding constituting the potential source 18, is located at an end opposite the ion source 10 and receives the type 2 and 3 ions shown as ② and ③. The magnetic field is applied in the direction of the Z coordinate i.e. in parallel to a line connecting ion source 10 to collector 16.

What is claimed is:

1. A process for separating two isotopes of a substance in which said isotopes are in very unequal proportions, comprising the steps of forming a plasma which contains the ions of said isotopes; applying a high frequency electric field and a perpendicular constant uniform magnetic field to said plasma, said electric field's frequency being for all practical purposes equal to the cyclotron frequency in the plasma of the ion of the least abundant isotope; including ions of a third type in the plasma, their proportion in the plasma being defined by the formula:

$$\frac{n_3}{n_2} = \frac{m_3}{m_2} \cdot \frac{\omega_{c1}^2 - \omega_{c3}^2}{\omega_{c2}^2 - \omega_{c1}^2}$$

where m, n, and $\omega$ designate respectively the mass, the number per unit of volume or concentration, and the cyclotron frequency of each type of ions in the plasma with the subscript 1 for the least abundant isotope, 2 for the other isotope and 3 for the said third type.

2. A process for separating isotopes in accordance with claim 1, wherein the concentrations $n_2$ and $n_3$ are for all practical purposes equal and the mass $m_3$ is chosen in such a manner as to satisfy for all practical purposes the relation: $m_3 = 2m_1 - m_2$.

3. A process for separating isotopes in accordance with claim 2, wherein the two isotopes are uranium $U_{235}$ and $U_{238}$ and the third type is thorium $Th_{232}$.

4. Apparatus for carrying out the process in accordance with claim 1, comprising: electrode means consisting of two plane parallel plates located at a predetermined distance from each other for applying said electric field to a region of space delimited by said plates;

means for emitting ions of said first and said second isotopes and of said third type into said space region, located at one extremity thereof; means for collecting ions located at the extremity of said space region opposite to that where said ion emitting means are located; and means for applying a magnetic field to said space region perpendicularly to said electric field and in parallel to a line connecting said ion emitting and collecting means, said plasma being confined within said space region.

* * * * *